Figure 1:
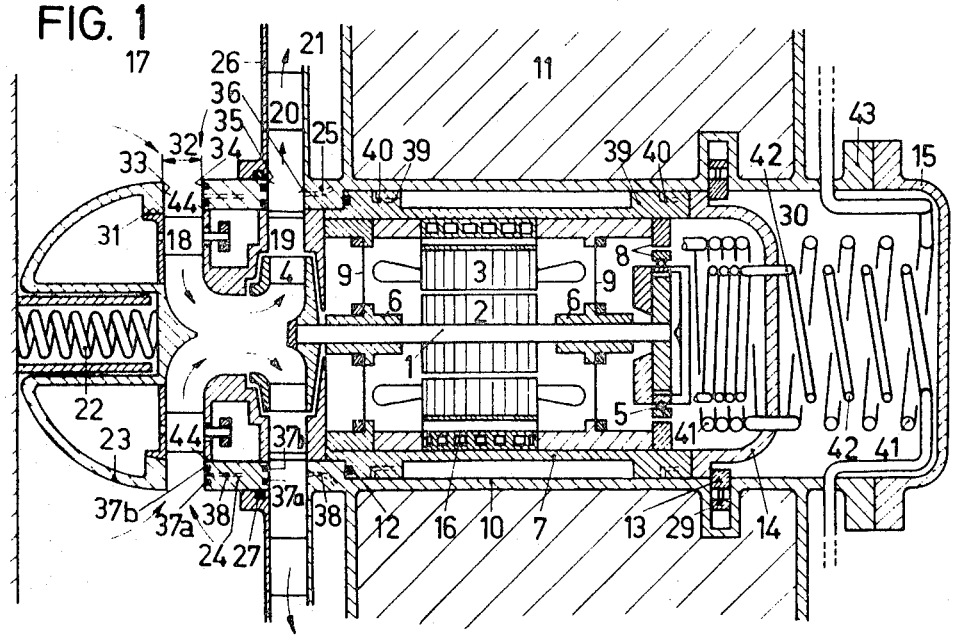

United States Patent

[11] 3,625,639

[72] Inventors: Jean Eggmann, Baden; Ernst Sidler, Fislisbach, both of Switzerland
[21] Appl. No.: 736,314
[22] Filed: June 12, 1968
[45] Patented: Dec. 7, 1971
[73] Assignee: Aktiengesellschaft Brown Boveri & Cie Baden, Switzerland
[32] Priority: June 22, 1967
[33] Switzerland
[31] 8968/67

[54] INTERCHANGEABLE CONVEYING APPARATUS FOR PRESSURIZED VESSELS SUCH AS REACTORS
9 Claims, 2 Drawing Figs.

[52] U.S. Cl. .................... 417/360, 222/333
[51] Int. Cl. .................... F04d 13/02, F24b 1/00
[50] Field of Search .................... 417/360, 423; 103/87, 87 D, 87 E, 218; 222/333, 385; 230/117, 235

[56] References Cited
UNITED STATES PATENTS

| | | | |
|---|---|---|---|
| 2,384,254 | 9/1945 | Meredew | 103/87 |
| 2,978,150 | 4/1961 | Doelcher | 222/333 |
| 3,072,069 | 1/1963 | Wittwer | 103/218 |

Primary Examiner—Robert M. Walker
Attorney—Pierce, Scheffler & Parker

ABSTRACT: An electric motor driving the impeller of a blower unit located at one end of the motor shaft is insertable in a guide sleeve extending through a wall of a nuclear reactor vessel. As the motor unit is pushed into the guide sleeve, the leading end of the blower unit engages and pushes back a spring loaded cover plate which had sealed the wall opening to prevent loss of pressure from the reactor vessel. When the combined motor and blower unit is withdrawn from the guide sleeve in the wall, the spring loaded cover plate automatically moves back into its sealing position.

PATENTED DEC 7 1971

3,625,639

Inventors
Jean Eggmann
Ernst Sidler

By Pierce, Schiffler & Parker
Attorneys

INTERCHANGEABLE CONVEYING APPARATUS FOR PRESSURIZED VESSELS SUCH AS REACTORS

The present invention relates to an interchangeable conveying apparatus for pressurized vessels, in particular an electric motor driven impeller operating as a circulating blower or a circulating pump for a nuclear reactor.

One of the following two methods is always provided in known gas-cooled nuclear reactor equipment for the exchanging of defective blowers:

a. The overhung blower impeller is provided on its rear with a so-called "self-sealing closure." This may be brought into engagement when the blower is stationary by axial displacement of the blower rotor. The impeller then provides the closure cover for the blower installation aperture. If the connection between impeller and shaft is detached it is possible for the blower (without the impeller and the stationary impeller rear wall) to be removed without the need for lowering the reactor pressure.

b. No self-sealing closure is provided. The blowers can be exchanged only if the reactor pressure is lowered. Special means are then still necessary in order to prevent the loss of reactor gas to the exterior and the ingress of air into the reactor.

The embodiment (a) suffers from the disadvantage that the impeller and the stationary impeller rear wall can be dismantled only if the reactor pressure is lowered by the method described under (b). The same limitations naturally apply to all other parts disposed distally relative to the self-sealing closure, such as suction branches, vortex regulators, throttling valves, diffusers, guide vanes, delivery ducts and the like.

Balancing of the impeller after installation on the new rotor is also possible only if method (b) is used for the exchange procedure.

The conveying apparatus according to the invention is characterized in that to facilitate the dismantling and installation of the conveying apparatus while maintaining the internal pressure of the pressure vessel, at least one housing part of the conveying apparatus is constructed as a closure ring between the suction and delivery sides, and a pressuretight closure cover is provided, both being axially displaceable.

Figure 2:
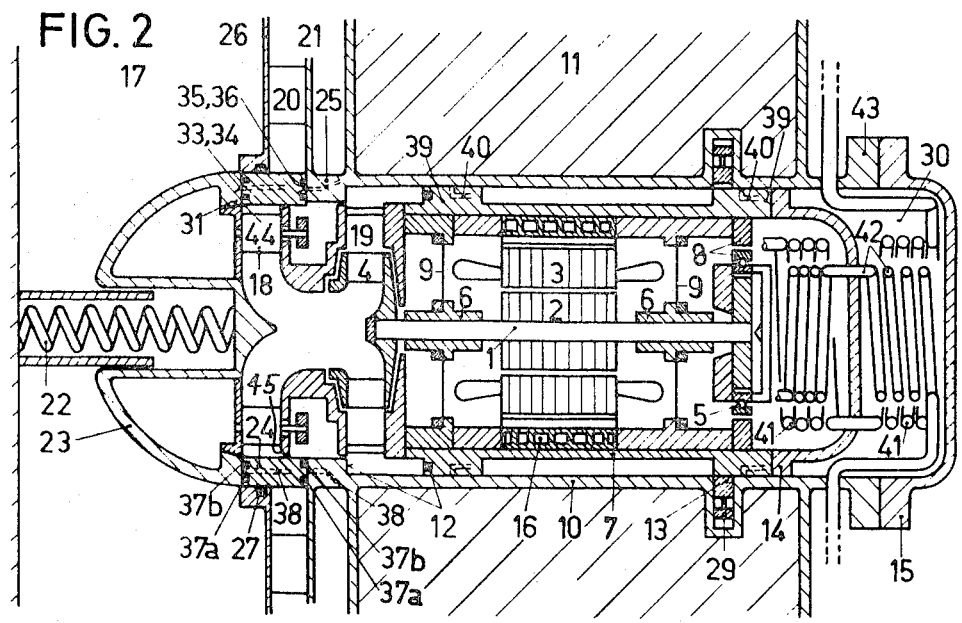

An exemplified embodiment of the invention is explained hereinbelow by reference to the accompanying drawing, in which:

FIG. 1 is a longitudinal section through a radial blower in a nuclear reactor shown in the operating position; and FIG. 2 is analagous to FIG. 1 but showing the blower in the dismantled position.

With reference now to the drawings, the shaft 1 is provided in its center with the rotor 2 of an electric motor 3, the impeller 4 being mounted on one end of the shaft while a thrust bearing 5 is mounted on the other end.

The rotor is furthermore journaled in two radial bearings 6 of the hydrodynamically lubricated type. The bearings are retained in the motor housing 7 by a cardan suspension 8 or by flexible diaphragms 9. The motor housing 7 is inserted into the blower connecting duct 10 of the reactor pressure vessel wall 11 and axially located thereat between a seal ring 12 and a clamping ring 13. The motor housing 7 is constructed in a pressuretight manner and closed by pressuretight inner cover 14. A pressuretight outer cover 15 provides an external closure for the blower connecting duct 10. A water cooler 16 is provided to dissipate the motor heat losses.

The gas is drawn in by the blower from chamber 17 of the interior of the reactor, then flows through the inlet guide vanes 18, the impeller 4, the subsequent unbladed diffuser 19, the outlet straightening vanes 20 and is delivered into the chamber 21 of the reactor circuit.

The self-sealing closure is formed by a helical spring 22, a pressuretight closure cover 23, a closure ring 24 and the flange 25 of the connecting duct 10. When the blower is in operation, the ring 24 forms part of a separating wall 26 between the chambers 17 and 21 of the reactor circuit. Leakage between the two chambers is prevented by a ring seal 27.

The following procedure is adopted for closing the self-sealing closure: while the blower is stationary and the outer cover 15 is closed, the clamping ring 13 is released by a radially acting drive mechanism 29. The blower together with the motor housing 7 is thus rendered slidable in the axial direction within the blower connecting duct 10. If the chamber 30 between the inner cover 14 and the outer cover 15 is maintained under the same pressure as that which prevails in the interior of the reactor, only the force exerted by the compression spring 22 will act axially upon the blower. The acting of the aforementioned spring, one end of which contacts an abutment and the other end of which contacts the end of the cover 23, causes the closure cover 23 to be pushed in the direction of the outer cover 15. Said cover will push the blower in front of itself to the right by transmitting the spring force via a tapered seat 31 on to the blower.

Initially, the ring 24 does not coexecute this movement. However, after the cover 23 has traversed the distance 32, the end surface 33 of the cover 23 will meet the end surface 34 of the ring 24 and begin to push the ring 24 in front of itself.

The movement comes to a stop when the opposite end surface 35 of the ring 24 bears upon the end surface 36 of the flange 25. The cover 23, the ring 24 and the flange 25 will thus form a pressuretight bell disposed above the blower connecting duct 10 (FIG. 2).

The sealing surfaces 33, 34, 35 and 36 can be made still more gastight by fitting ring seals for which metal-O-rings, soft metal rings or other elements and materials may be employed. In this embodiment the seals are formed by two concentric rings 37a and 37b each, between which a controlled quantity of gas can be drawn off through ducts 38 in order to increase the sealing effect.

The axial force exerted by the spring 22 can be increased if required by lowering the pressure in chamber 30. The pressure difference which prevails between the interior of the reactor and the chamber 30 will then act upon the cover 23, said difference, cooperating with the force exerted by the spring 22, being sufficient to move the self-sealing closure into position even if large frictional forces occur.

The friction between the motor housing 7 and the connecting duct 10 can be reduced if the motor housing 7 is supported in the connecting duct 10 either on rollers or, as shown, on hydrostatic gas bearings 39, that is to say those which are supplied with gas under pressure. This pressurized gas is supplied through the ducts 40 only when the blower is inserted or retracted.

In order to permit retraction of the blower while the cover 15 is closed, all pipelines and electrical cables in the chamber 30 are constructed in flexible form. All pipelines 41 and electric cables 42 in the intermediate chamber 30 are therefore constructed and disposed in helical or spiral form.

After the self-sealing closure has been moved into the position depicted in FIG. 2, it is possible for the blower to be removed from the connecting duct 10. To this end, the space between the outer cover 15 and the self-sealing closure is evacuated and filled with ambient air. The cover 15 may then be dismantled, the pipelines and cables detached from the flange and the blower removed.

For reinstallation the blower is introduced into the connecting duct 10, the pipelines and cables are connected to the flange 43, the cover 15 is mounted in position, the space between the self-sealing closure and the cover 15 is evacuated and then filled with reactor gas. The pressure in the intermediate chamber 30 is then increased so that the thrust acting upon the cover 14 exerts and axial force resulting from the gas pressure upon the self-sealing closure and spring 22, and the said closure will begin to open. The blower together with the motor housing 7 and the cover 14 then function as a piston which pushes back the closure cover 23 against the spring 22 via the tapered seat 31 by virtue of the pressure which prevails throughout the chamber 30. The ring 24 initially remains in the position shown in FIG. 2 until the tapered surface 45 of the blower inlet socket strikes the corresponding tapered surface 44 of the ring. The cover 23 on the seat 31 and the ring 24 on the seat 44 then move together with the blower against the force exerted by the spring 22 until they reach their working position.

The movement comes to a stop when the seal 12 of the motor housing 7 strikes against the flange 25 of the connecting duct 10. If the clamping ring 13 is then moved into position by means of the drive mechanism 29, the motor housing 7 will then once again be clamped between the seal 12 and the clamping ring 13. The blower will then be ready for operation.

In the embodiment described hereinabove a special closure cover is used instead of the impeller for isolating in gastight manner from the reactor circuit the blower together with the impeller, stationary impeller rear wall and all parts requiring occasional replacement and being disposed distally relative to the impeller. It is therefore possible, without shutting down the reactor or even lowering the reactor pressure, to replace all those parts which might require inspection or repair. Furthermore, it is then possible for the complete blower rotor to be balanced prior to reassembly, a feature of particular importance in gas-bearing blowers.

To summarize, the closure of single-stage blower normally considered is effected by two parts which are displaced by single drive mechanism in such a manner that they simultaneously seal off in gastight manner the inlet as well as the exit of the blower. One of the two parts forms a section of the separating wall between the suction and delivery side of the reactor circuit when the blower is in operation. A spring, disposed in the interior of the reactor, pneumatically reinforced where necessary, serves as drive mechanism for effecting closure. The closure cover is moved into position by releasing the connection between he motor housing and the reactor pressure vessel. The axial displacement of the closure cover is accompanied by axial displacement of the entire blower in the interior of the blower connecting duct of the reactor pressure vessel.

The closure cover is opened by the insertion of the complete blower into the blower connecting duct of the reactor pressure vessel against the thrust exerted by the reactor gas and the force exerted by the previously mentioned spring.

The outer cover of the blower must, of course, be closed for as long as the self-sealing closure is not closed while the blower is installed or dismantled. Remote control means must therefore be employed when the outer cover is closed for moving into position of the blower and locating same in the reactor pressure vessel during installation as well as for releasing said location followed by axial retraction of the blower during dismantling.

The invention may also be applied to pumps of liquid-cooled reactors provided such pumps are fitted into the wall of the reactor pressure vessel. The closure cover may also comprise a plurality of parts and need not be constructed as spherical shell. Moreover, a force exerting element other than a spring may be employed. The knowledge disclosed by the invention is also applicable to multistage blowers and pumps and is not confined to nuclear reactors.

We claim:

1. Interchangeable motor driven blower apparatus for use in circulating a fluid within a pressure vessel such as a nuclear reactor comprising a cylindrical housing containing a motor, a blower including a cylindrical casing having axially spaced radial inlet and outlets and which is structurally united with said motor housing adjacent one end wall thereof, an impeller within said blower casing and secured to the motor shaft, said motor housing and blower casing being slidable mounted in a cylindrical duct extending through a wall of said vessel, said blower being located within said pressure vessel when fully inserted in said duct such that said blower outlet is aligned with an inlet to a chamber located within said pressure vessel but separated by a partition wall from the remaining interior portion of said vessel and said blower inlet communicates with said remaining interior portion, an axially displaceable cylindrical closure rung surrounding said blower casing and which is located intermediate said blower inlet and outlet in the full inserted position of said blower, an axially displaceable closure cover mounted within said pressure vessel coaxially with and opposite one end of said closure ring, means biasing said closure cover in the direction of said closure ring such that when said blower is withdrawn from the interior of said pressure vessel said closure cover automatically shifts axially towards and sealingly engages said closure ring at one end thereof thereby to shift said closure ring to a position closing off said inlet to said chamber and effecting a sealing engagement between the other end of said closure ring and the inner end of said duct, said blower being engageable with said closure ring and with said closure cover upon its reinsertion within said vessel thereby to shift said closure ring and closure cover in the opposite direction to their original positions, and a removable cover for the outer end of said duct to enable said blower and motor housing to be removed.

2. Apparatus as defined in claim 1 wherein said means for biasing said closure cover in the direction of said closure ring is constituted by spring means, one end of said spring means being fixed within said pressure vessel and the other end exerting pressure against said closure cover.

3. Apparatus as defined in claim 1 and which includes means for introducing fluid under pressure between the end of said motor housing and the closed outer end of said duct for effecting movement of said motor housing and blower to its fully inserted position within said duct against the counter action of said biasing means for said closure cover.

4. Apparatus as defined in claim 3 and which further includes means for securing said motor housing and blower in the fully inserted position against the counter biasing action of said closure cover.

5. Apparatus as defined in claim 1 wherein the sealing engagement of the opposite ends of said closure ring with said closure cover and inner end of said duct respectively is effected by means of radially spaced sealing rings.

6. Apparatus as defined in claim 5 and which further includes means located between said radially spaced sealing rings for drawing off any leakage fluid therebetween at the interfaces of said closure ring and closure cover and inner end of said duct respectively.

7. Apparatus as defined in claim 5 and which further includes means located between said radially spaced sealing rings for introducing a barrier medium to the interfaces of said closure ring and closure cover and inner end of said duct respectively.

8. Apparatus as defined in claim 1 and which further includes means for reducing the sliding friction between he surface of the motor housing and inner surface of said duct to facilitate removal and replacement of said motor housing and blower.

9. Apparatus as defined in claim 8 wherein said means for reducing the sliding friction between said motor housing and duct is constituted by pressurized gas bearings.

* * * * *